United States Patent
Joshi et al.

(10) Patent No.: US 10,480,863 B2
(45) Date of Patent: Nov. 19, 2019

(54) METHOD OF MANUFACTURING ACTIVELY COOLED ACCELERATOR GRID WITH FULL PENETRATION WELD CONFIGURATION

(71) Applicant: Institute for Plasma Research, Ahmedabad (IN)

(72) Inventors: Jaydeep Joshi, Ahmedabad (IN); Chandramouli Rotti, Ahmedabad (IN); Arunkumar Chakraborty, Ahmedabad (IN)

(73) Assignee: Institute for Plasma Research, Ahmedabad (IN)

( * ) Notice: Subject to any disclaimer, the term of this patent is extended or adjusted under 35 U.S.C. 154(b) by 121 days.

(21) Appl. No.: 15/709,706

(22) Filed: Sep. 20, 2017

(65) Prior Publication Data

US 2019/0011188 A1 Jan. 10, 2019

(30) Foreign Application Priority Data

Jul. 5, 2017 (IN) .............................. 201721023589

(51) Int. Cl.
  *F28D 7/00* (2006.01)
  *B23P 15/26* (2006.01)
  (Continued)

(52) U.S. Cl.
  CPC ........... *F28D 7/0075* (2013.01); *B21D 53/08* (2013.01); *B23K 9/0282* (2013.01);
  (Continued)

(58) Field of Classification Search
  CPC ........ F28D 7/0075; F28D 7/0066; F28D 7/06; F28D 7/16; F28D 7/163; F28D 7/1669;
  (Continued)

(56) References Cited

U.S. PATENT DOCUMENTS

| 4,841,118 A * | 6/1989 | Overbay | B23K 9/0284 |
| | | | 219/124.03 |
| 2003/0010410 A1* | 1/2003 | Polvi | B23K 20/023 |
| | | | 148/528 |

(Continued)

FOREIGN PATENT DOCUMENTS

| GB | 2122926 A | 1/1984 |
| KR | 100727680 B1 | 6/2007 |

*Primary Examiner* — Jermie E Cozart
(74) *Attorney, Agent, or Firm* — The Webb Law Firm (57) ABSTRACT

Disclosed is an improved method of manufacturing cooled accelerator grid with full penetration weld configuration. In a preferred form, the method includes the steps of: machining a plurality of stubs, a first and a second end of a plurality of inconel pipes; welding the stubs with the first end of the inconel pipes forming a water connector assembly; machining of a base plate; welding the base plate with the water connector assembly; machining the base plate welded with the water connector assembly, wherein machining further comprises milling of plurality of cooling channels across angled plane of the base plate welded with the water connector assembly; closing of plurality of cooling channels located on the base plate welded with the water connector assembly; and welding each of plurality of external hydraulic circuits with the second end of each of the plurality of inconel pipes.

6 Claims, 9 Drawing Sheets

(51) Int. Cl.
- *F28D 7/06* (2006.01)
- *B21D 53/08* (2006.01)
- *F28D 7/16* (2006.01)
- *B23K 9/028* (2006.01)
- *B23K 15/00* (2006.01)
- *H01J 27/02* (2006.01)
- *B24B 7/16* (2006.01)
- *B23K 101/14* (2006.01)
- *B23K 103/04* (2006.01)
- *B23K 103/12* (2006.01)
- *H05H 3/00* (2006.01)

(52) U.S. Cl.
CPC ........ *B23K 9/0288* (2013.01); *B23K 15/0006* (2013.01); *B23K 15/0053* (2013.01); *B23P 15/26* (2013.01); *B24B 7/16* (2013.01); *F28D 7/0066* (2013.01); *F28D 7/06* (2013.01); *F28D 7/16* (2013.01); *H01J 27/024* (2013.01); *B23K 15/0046* (2013.01); *B23K 15/0093* (2013.01); *B23K 2101/14* (2018.08); *B23K 2103/05* (2018.08); *B23K 2103/12* (2018.08); *F28D 7/163* (2013.01); *F28D 7/1669* (2013.01); *H05H 3/00* (2013.01); *Y10T 29/49364* (2015.01); *Y10T 29/49368* (2015.01); *Y10T 29/49373* (2015.01); *Y10T 29/49393* (2015.01)

(58) Field of Classification Search
CPC ................ B23K 9/0282; B23K 9/0288; B23K 2103/05; B23K 2103/12; B23K 2103/14; B23K 15/00; B23K 15/0046; B23K 15/0053; B23K 15/0093; B23P 15/26; B21D 53/08; Y10T 29/49364; Y10T 29/49368; Y10T 29/49373; Y10T 29/49393

See application file for complete search history.

(56) References Cited

U.S. PATENT DOCUMENTS

| | | | |
|---|---|---|---|
| 2005/0263262 A1* | 12/2005 | Lewis | F28D 7/0066 165/61 |
| 2008/0000625 A1* | 1/2008 | Baylis | B29C 65/02 165/173 |
| 2013/0189536 A1* | 7/2013 | Honma | B32B 15/011 428/576 |

* cited by examiner

METHOD OF MANUFACTURING ACTIVELY COOLED ACCELERATOR GRID WITH FULL PENETRATION WELD CONFIGURATION

CROSS-REFERENCE TO RELATED APPLICATION

This application claims priority to Indian Patent Application No. 201721023589 filed Jul. 5, 2017, the disclosure of which is hereby incorporated in its entirety by reference.

FIELD OF THE DISCLOSURE

The present invention particularly relates to an improved method of manufacturing actively cooled accelerator grid with full penetration weld configuration.

BACKGROUND OF THE INVENTION

Conventionally water cooling channels of grids (plate of Oxygen Free Copper) are connected with external hydraulic circuit (stub of stainless steel) by using a solid state welding process, known as friction welding (FW). The joining in this technique is realized by generating heat through mechanical friction between the joinable plate and stub while they are in relative motion. Further, an axial force is applied to plastically displace and fuse the material with each other.

An important aspect of manufacturing of actively cooled accelerator grids for example (180 mm width, 500 mm height and 10 mm thickness) for Neutral Beam (NB) sources is the interfacing of the copper (Cu) water cooling stub with Cu base plate. Conventional procedures utilize a process of friction welding where joining is achieved by the heat of friction and addition of pressure. Limitations related to process like the restricted choice of orientation, vibration during the process, the basic plate accuracies achieved before welding, need of post welding machining, formation of intermetallic compound between SS and Cu, lack of full inspectability and no options for repairing the welding joint has led to a need for identifying a joining configuration and process which overcomes the drawbacks of the existing one followed by qualification of the same.

Prior art techniques of FSW include the following drawbacks: (a) the required relative motion between pipe and plate limits the welding positions and orientation; (b) vibration during the welding process damages the already achieved dimensional accuracies of the grid plate which is undesirable (specifically in the case of angled grid); (c) need for removal of excess material accumulation on the outer surface of the joining which leads to a post-welding finishing machining stage in the manufacturing process; (d) the metallurgical incompatibility of SS and Copper during the FW forms undesirable intermetallic compound; (e) an effective inspection methodology for this kind of joints have not been established and therefore the full integrity of the weld joint cannot be guaranteed; and (f) in case of any unacceptable defect found in the joint, there are limited options available for repairing the weld and therefore large numbers of plates have to be wasted.

It is therefore an object of the invention to propose an improved method of manufacturing actively cooled accelerator grid with full penetration weld configuration, which achieves full weld penetration.

Another object of the invention is to propose an improved method of manufacturing actively cooled accelerator grid with full penetration weld configuration, which allows 100% volumetric inspection to detect defects.

Yet another object of the invention is to propose an improved method of manufacturing actively cooled accelerator grid with full penetration weld configuration, which avoids grid rotation and maintains already achieved dimensional accuracy.

A further object of the invention is to propose an improved method of manufacturing actively cooled accelerator grid with full penetration weld configuration, which eliminates the use of filler material.

A still further object of the invention is to propose an improved method of manufacturing actively cooled accelerator grid with full penetration weld configuration, which requires zero post-welding finishing machining.

Another object of the invention is to propose an improved method of manufacturing actively cooled accelerator grid with full penetration weld configuration, which produces metallurgically consistent weld and avoid formation of intermetallic compounds.

A still another object of the invention is to propose an improved method of manufacturing actively cooled accelerator grid with full penetration weld configuration, which employs a fully automatic welding technique.

Yet another object of the invention is to propose an improved method of manufacturing actively cooled accelerator grid with full penetration weld configuration, which produces repeatable, repairable and consistent weld joint.

BRIEF SUMMARY OF THE INVENTION

Accordingly, there is provided an improved method of manufacturing actively cooled accelerator grid with full penetration weld configuration. In a preferred form, the aforesaid method includes the steps of machining a plurality of copper stubs in shape of 'U' followed by machining a first end and a second end of each of a plurality of inconel pipes followed by their welding to make a water connector assembly. Furthermore, the method step includes machining of a base plate to prepare plurality of weld edges in specific configuration which enables the full penetration welding and further could be inspected 100% volumetrically, which are in accordance to plurality of reference holes located on the base plate. Furthermore, in an embodiment, the method includes full penetration welding of the base plate with the water connector assembly followed by electron beam welding technique.

In another embodiment, the method includes drilling operation of the stub through the tubular end to create hydraulic access up to the manifold within the base plate. In a preferred aspect, further machining comprises milling of plurality of cooling channels across angled plane of the base plate welded with the water connector assembly by means of copper electro deposition technique. In another embodiment, the method further includes closing of plurality of cooling channels located on the base plate welded with the water connector assembly. In another embodiment, drilling of apertures on the base plate is performed post which, in an aspect, welding each of plurality of external hydraulic circuits with the second end of the each of the plurality of inconel pipes is performed.

BRIEF DESCRIPTION OF THE DRAWINGS

The drawings refer to embodiments of the invention in which.

DETAILED DESCRIPTION OF A PREFERRED EMBODIMENT OF THE INVENTION

The following is an example of a method for manufacturing an actively cooled accelerator grid with full penetration weld configuration consistent with the present disclosure. Reference is made to all FIGS. 1A-9 in this example.

Step 1 includes machining one or more copper stubs 10 from copper block.

Figure 1A:
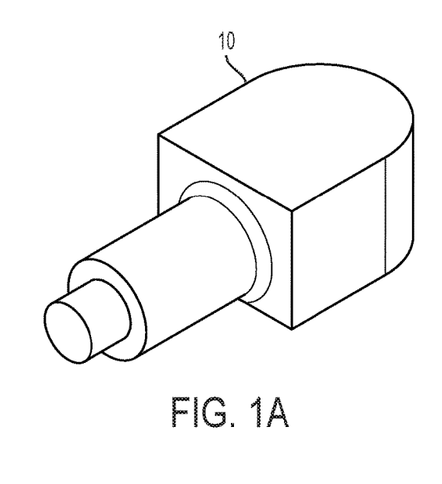
FIG. 1A shows a perspective view of a Cu Stub.
Figure 1B:
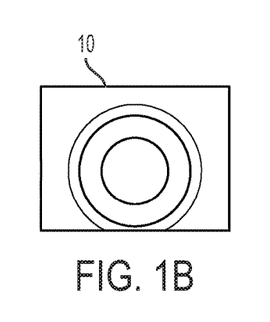
FIG. 1B shows an end view of the Cu stub of FIG. 1A.
Figure 1C:
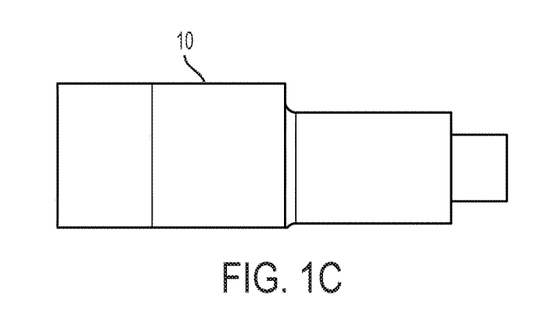
FIG. 1C shows a side view of the Cu stub of FIG. 1A.
Figure 1D:
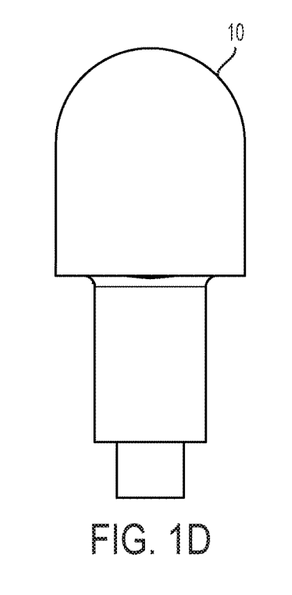
FIG. 1D shows a top view of the Cu stub of FIG. 1A.
Figure 2:
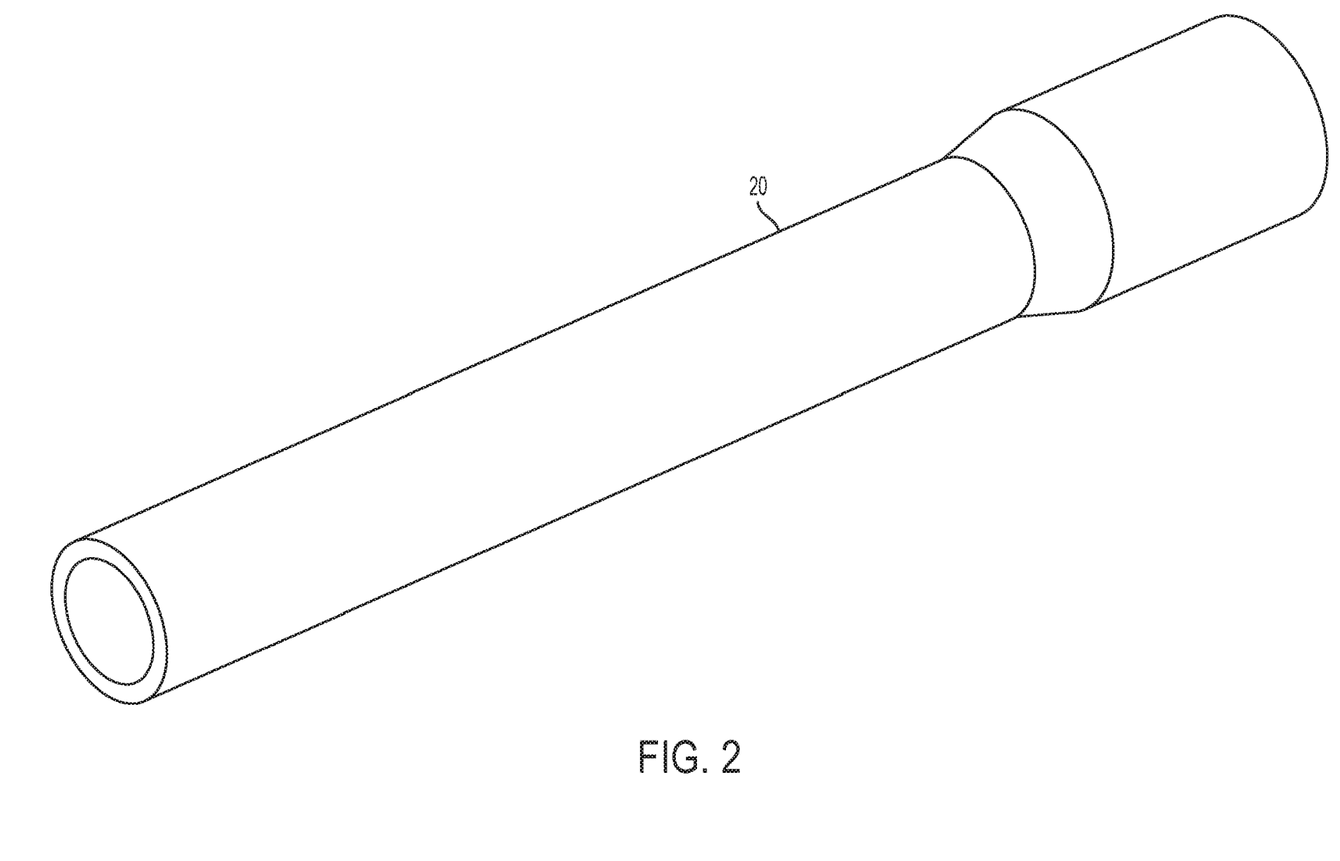
FIG. 2 shows a perspective view of an Inconel Pipe.

Step 2 includes machining one or more Inconel pipes 20.

Figures 3A, 3B, 3C:
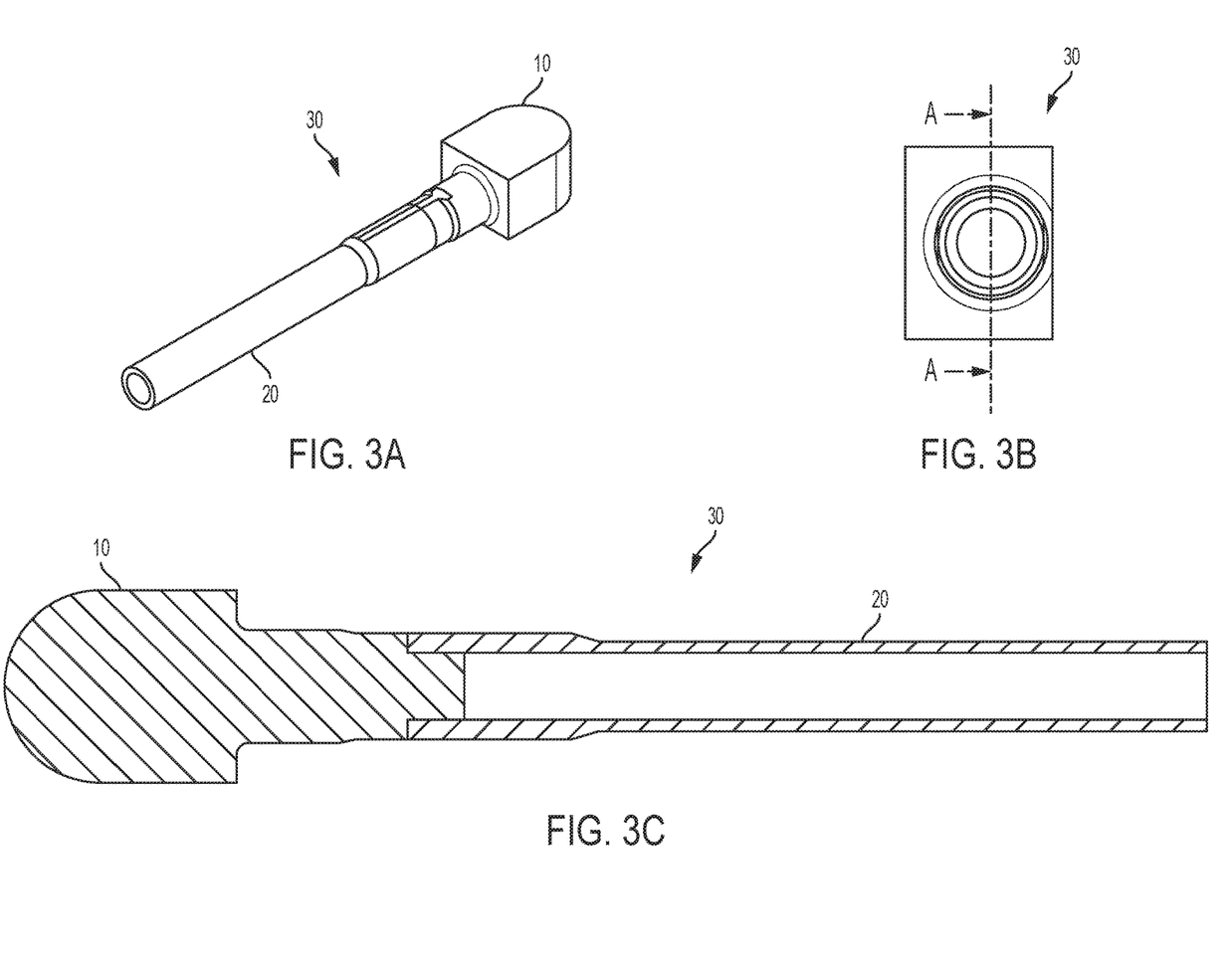
FIG. 3A shows a perspective view of Water Connector Assembly (also herein "sub-assembly") formed by the welding of a stub with an Inconel pipe.
FIG. 3B is an end view of the water connector assembly of FIG. 3A.
FIG. 3C is a side cross-sectional view of the water connector assembly of FIG. 3A.

Step 3 includes electron beam welding of a copper stub with an inconel pipe. In examples, the parameters of the welding process of Step 3 may include: Acceleration Voltage 120 kV; Beam Current 9.5 mA; Speed: 10 mm/sec; Working distance 400 mm; Beam Current at focus: 3000 mA; Up slop: 35°; Overlap: 360°; Slope off: 180°; and Outside turning 2 mm. The welding of the stub 10 with the inconel pipe forms a water connector 30.

Figure 4A:
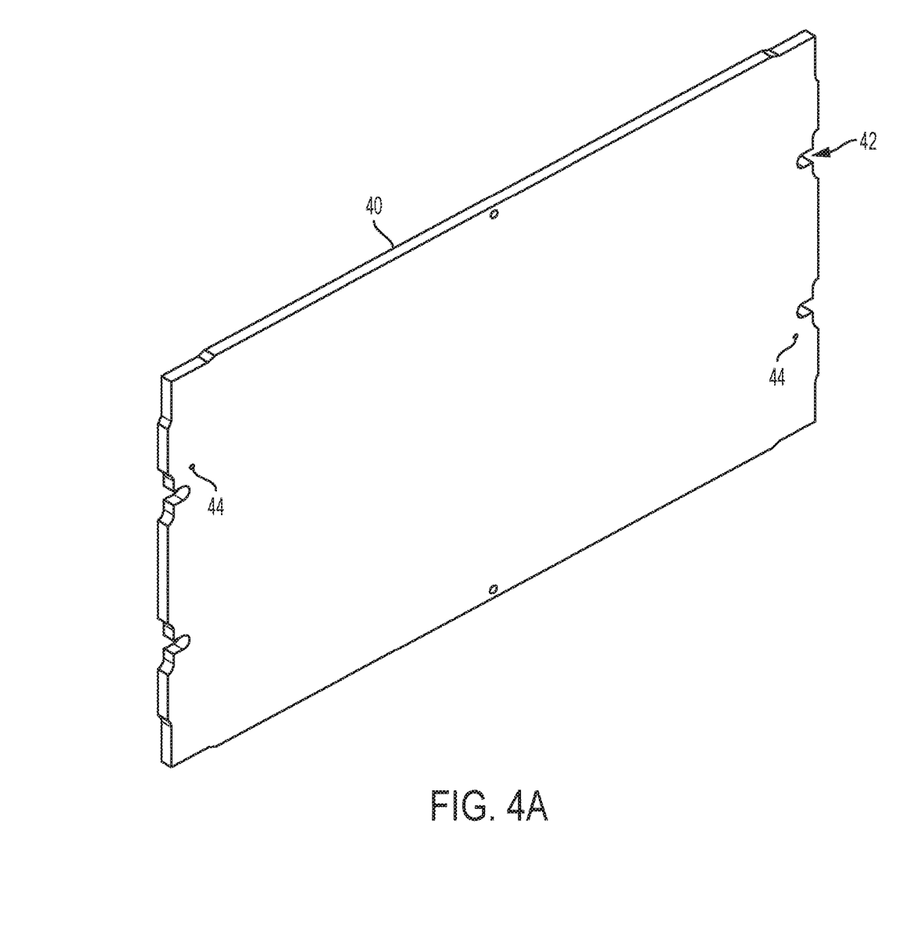
FIG. 4A is a perspective view base plate of Cu plate with weld edge preparation.
Figure 4B:
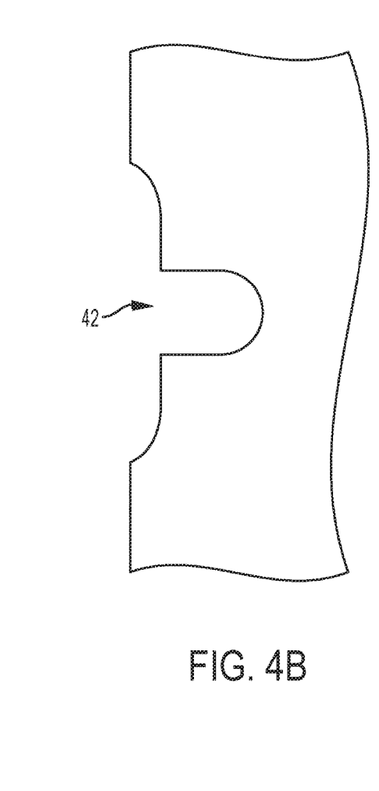
FIG. 4B shows a base plate showing a weld edge preparation.

Step 4 of an exemplary method includes machining of base plate 40 and preparation of pocket (i.e. Weld Edge Preparation 42) for machining water connector 30 with respect to reference holes 44.

Figure 5A:
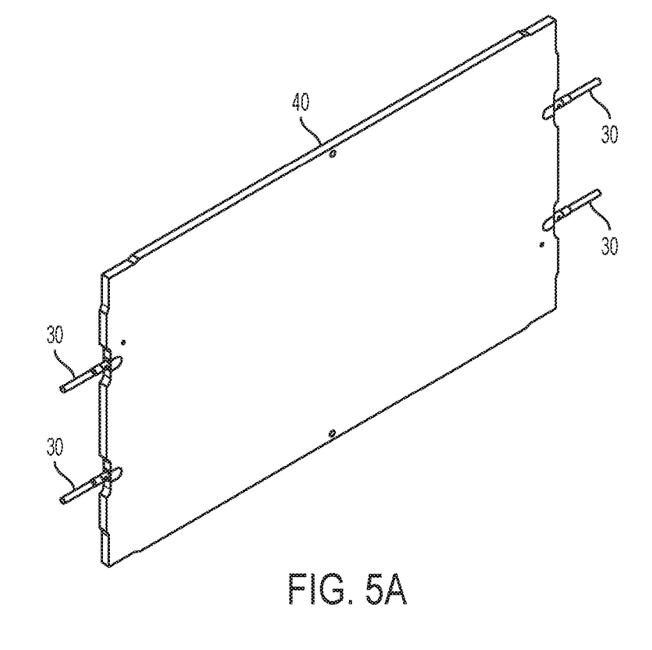
FIG. 5A shows a perspective view of EBW welding of with a base plate with a water connector assembly.
Figure 5B:
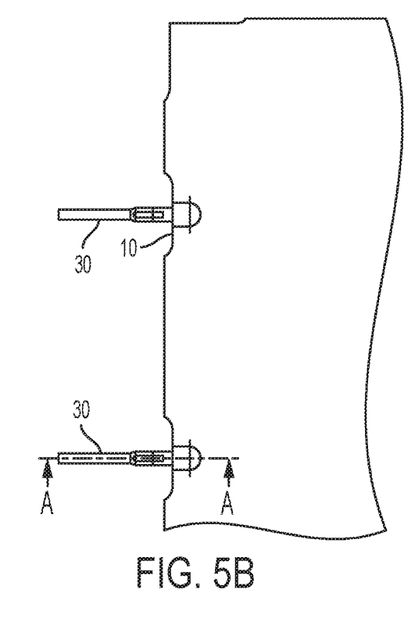
FIG. 5B shows a base plate with a water connector assembly.

Step 5 includes Electron Beam welding of base plate 40 and water connector. In examples, the parameters of the electron beam welding process of Step 5 may include: Acceleration Voltage 130 kV; Beam Current 58-70 mA; Speed 7 mm/sec; Working distance 400 mm; Beam Current at focus: 2035 mA; Upslop: 5 mm; Overlap: NA; Slope off: 4 mm; and Outside turning NA.

Figure 5C:
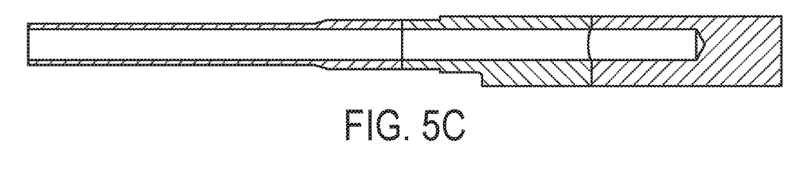
FIG. 5C shows a cross-sectional view of a drilling operation of the stub through the tubular end to create hydraulic access up to the manifold within the base plate.

A quality check may be performed of this step by: X-ray examination of welds and/or drilling through the water connector and He leak test of weld seam.

Figure 6:
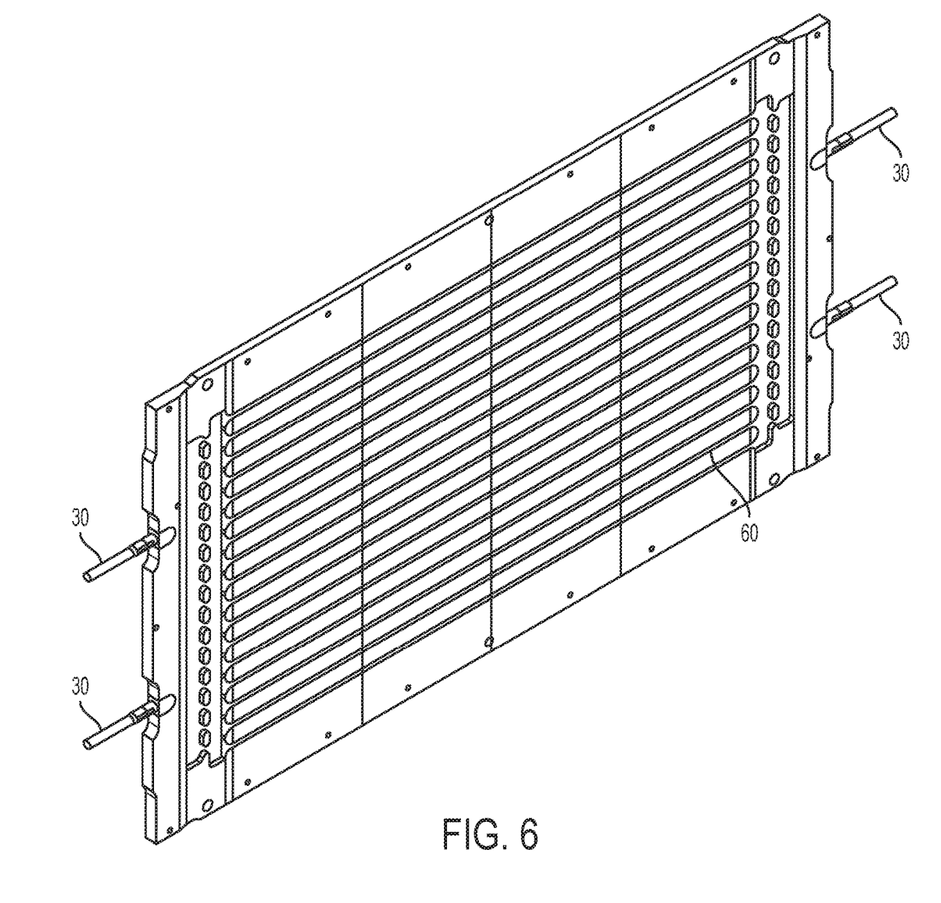
FIG. 6 shows a milling operation for cooling channels on angled plane in a base plate.

Step 6 includes machining operation for milling of cooling channels 60 on angled plane.

Figure 7:
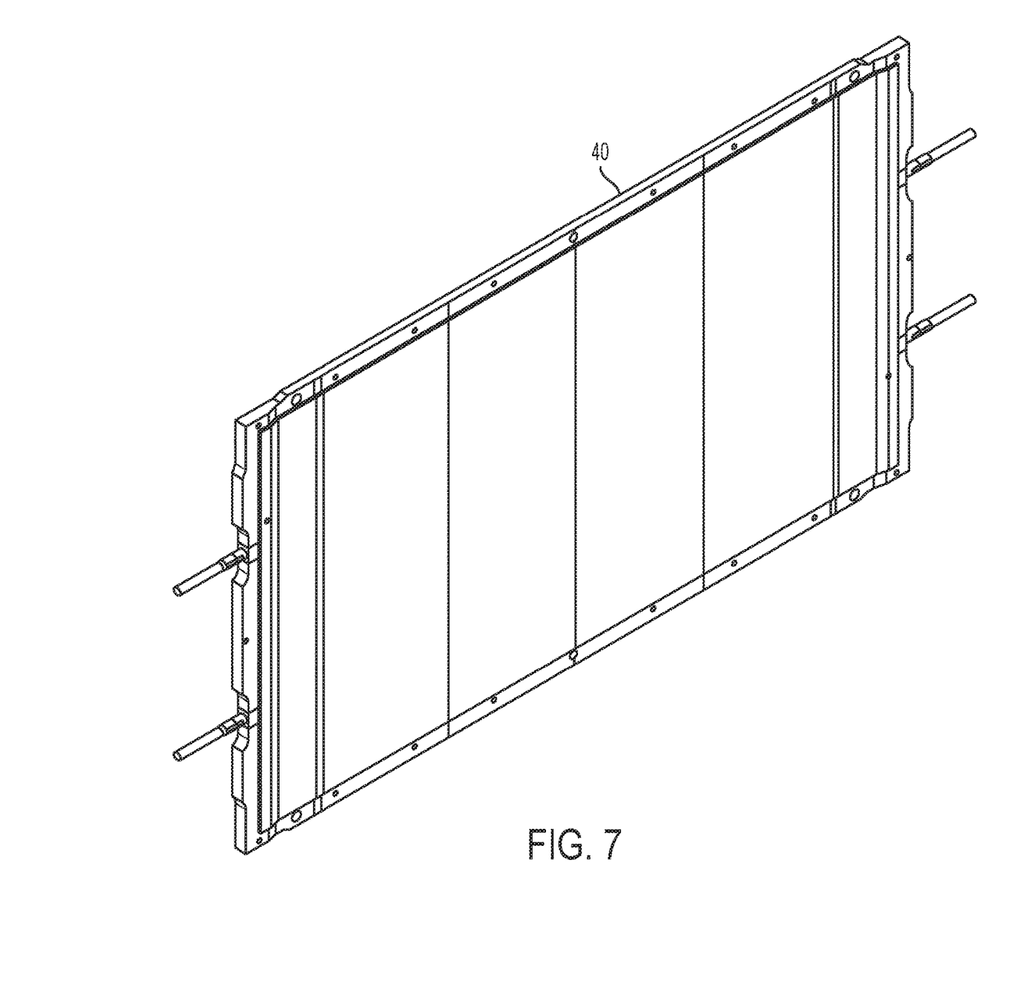
FIG. 7 shows a closing of water channel by electro-deposition.

Step 7 includes closing of water channels by electro deposition process. A quality check of this step may be performed by: a helium (He) leak test; flow test by infrared thermography; pressure test; and/or thickness measurement of the deposited layer.

Figure 8:
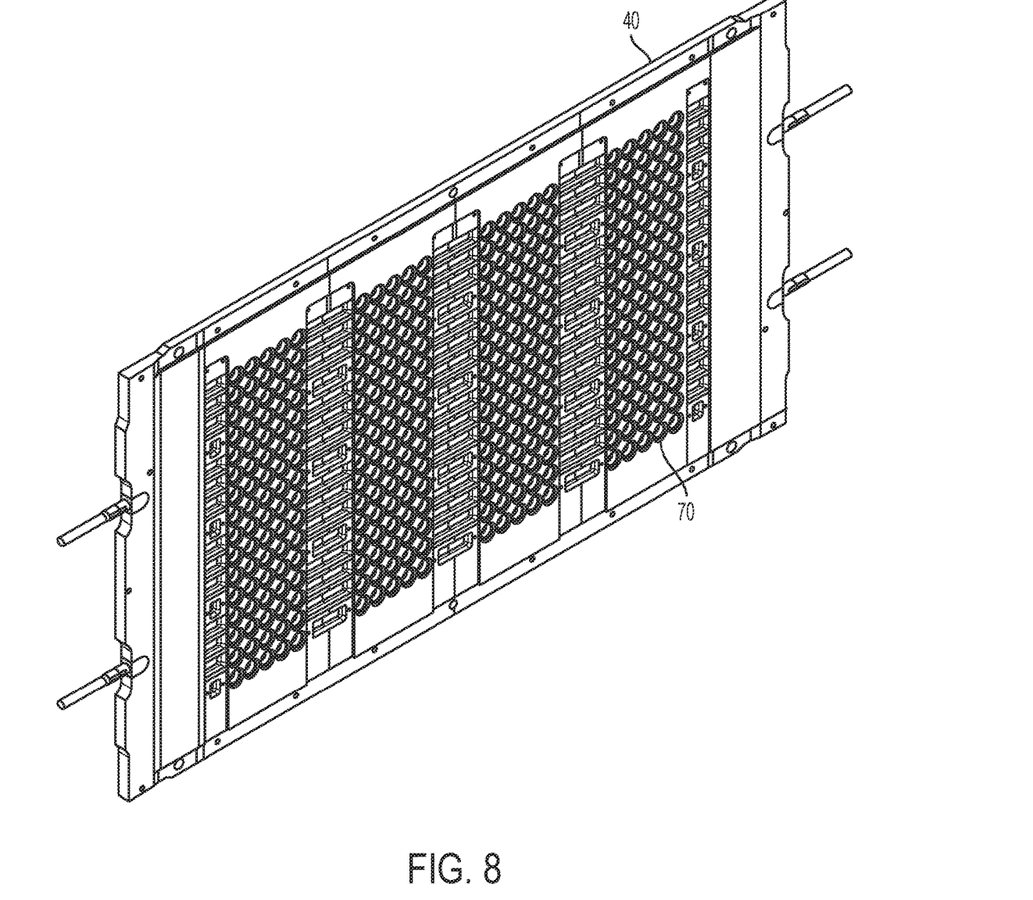
FIG. 8 shows machining of apertures and scope-out of material on a base plate.

Step 8 includes machining (for example, drilling) of apertures 70. A quality check of this step may be performed by: Dimensional control of the positioning with respect to reference holes.

Figure 9:
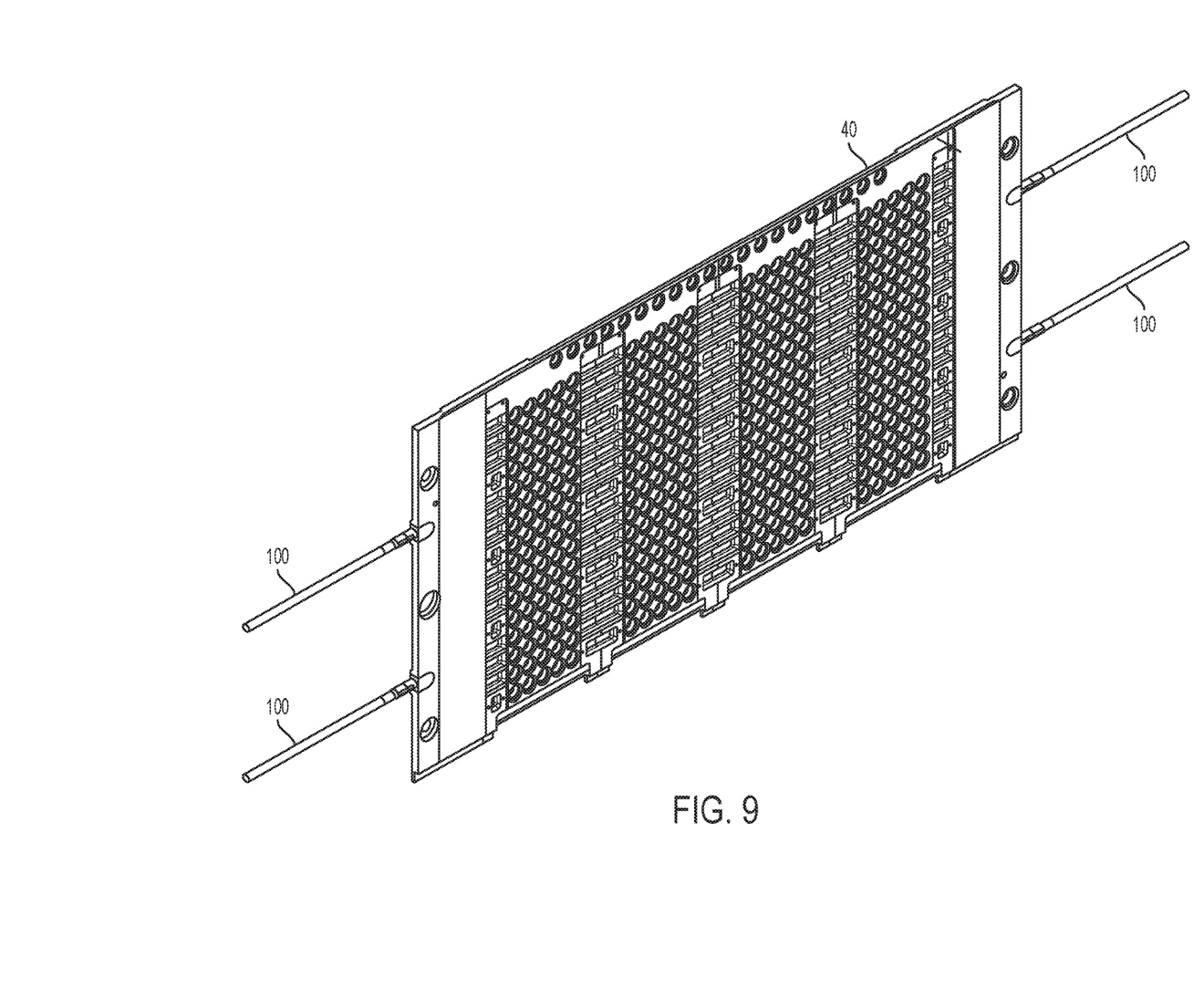
FIG. 9 shows an accelerator grid with stainless steel tubes attached.

Step 9 includes welding of stainless steel tube 100 (i.e., external hydraulic circuit) with Inconel extension by orbital TIG welding. A quality check of this step may be performed by: a final He leak test and/or pressure test.

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

It will be apparent, however, to one of ordinary skill in the art that the present invention may be practiced without specific details of the well known components and techniques.

In other instances, well known components or methods have not been described in detail but rather in a block diagram in order to avoid unnecessarily obscuring the present invention. Further specific numeric references should not be interpreted as a literal sequential order. Thus, the specific details set forth are merely exemplary. The specific details may be varied from and still be contemplated to be within the spirit and scope of the present invention. The features discussed in an embodiment may be implemented in another embodiment.

The present invention provides an improved method of manufacturing actively cooled accelerator grid with full penetration weld configuration. Thus, the base plate 40 with small machining may adopt the hydraulic feed stubs 10 as a weld inserts in a butt weld configuration. This stub 10 is then welded to the base plate 40 through full penetration Electron beam weld. The stub 10 is then drilled through from Pipe end to create hydraulic access up to the manifold within the base plate 40. This innovative technique of weld configuration has been applied to the batch manufacturing process and tested for all acceptance parameters. The innovation that is proposed for protection lies in the configuration of the weld design, process to open-up the access to the hydraulic channel and its novel aspect of full penetration which enables full inspectability. The steps of achieving the objects of the invention as disclosed aforesaid are clearly disclosed by FIGS. 1A-9.

A joint configuration has been successfully welded 'through thickness' resulted in full penetration weld. The joint configuration has been examined 100% volumetrically (radiographic technique) which has revealed the full integrity of this joint. This weld is realized by fusion welding technology without the requirement of grid rotation. This has simplified the machining fixture for the welding (i.e. only planar movement of bed is needed and no rotational/angular movement is required). Further the 'Autogeneous' nature of the technique has eliminated the additional complexity of filler material matching chemistry and related auxiliary accessories. As far as the surface condition of the weld is concerned, negligible post-welding machining is required (practically nil), which allows to use the component in 'as welded' condition. Therefore there is no impact of the welding step on the machining accuracies already achieved on the grid plate surfaces (this is important for the case of 'angled' grid which are sensitive to each of the manufacturing operations). The configuration provides the correction option (no limitation on cut- and reweld based on the width of plate) by repairing the weld without damaging/wasting the base plate. The process is fully automated such that manual intervention are totally omitted once the parameters are established, and therefore, the high level of repeatability, consistency is achieved. The configuration also ensures that there is no trapped volume and therefore the chances of virtual leaks under the Ultra High Vacuum (UHV) environment is avoided.

In one aspect, the qualification of this weld is carried out by subjecting it to various mechanical testing (tensile test, bend test and hardness test) and the properties achieved are as per the functional requirements. Additionally, the joint has been subjected to three times thermal cycling (at temp. of 160 C) followed by pressure test (up to 30 bars) and helium leak tightness (to leak rate better than 1 E-9 mbarl/s). Further, the joint has the mechanical properties (strength and ductility) equivalent to that of the base material so provided 100% joint efficiency and design parameters remains unaffected. The full penetration mode does not trap the gases and therefore suitable for vacuum environment where the virtual leaks are not desirable. The development has led to a water tight vacuum boundary joint which fulfills the functional requirement as well as provide the user oriented production process characteristics. The process is suitable for the mass production of grids with highest repeatability, full integrity of joint and vacuum tightness to the UHV level.

The following non-limiting examples illustrate embodiments of the invention according to the present disclosure:

Examples

A prototype grid of the 1:1 size has been manufactured by using the above mentioned technique.

Real Grid production (17 nos) is in-progress with above mentioned technique.

The inventive process includes a weld joint design (square butt with 'U' shape); a technique of creating the passage through drilling; a welding orientation; a welding technique; and a welding position.

The invention according to the present disclosure includes the following advantages.

Full penetration fusion weld configuration.

No direct dissimilar welding with base plate and therefore avoiding the metallurigical issues (which otherwise would arise in case of SS to Cu weld joint).

100% volumetrically inspectable which ensures the full integrity and therefore 100% joint efficiency. This keeps the designed parameters unchanged.

Realized by fusion welding technology without the requirement of grid rotation. This has simplified the machining fixture for the welding (i.e only planer movement of bed is needed and no rotational/angular movement is required). Further the Autogeneous' nature of the technique has eliminated the additional complexity of filler material matching chemistry.

The configuration allows 100% defect detection for complete weld volume by radiography technique and therefore the joint integrity is ensured, established and examination records can be stored easily.

Negligible post-welding machining is required (practically nil), which allows to use the component in 'as welded' condition. Therefore there is no impact of the welding step on the machining accuracies already achieved on the grid plate surfaces (this is important for the case of angled grid which are sensitive to each of the manufacturing operations).

The configuration provides the correction option by repairing the weld without damaging/wasting the base plate.

Least amount of manual intervention once the parameters are established and therefore, the high level of repeatability, consistency are achieved.

UHV compatible water to vacuum boundary (qualified for He leak rate of 1 E-9 mbarl/s).

High pressure and high temperature operational parameters (qualified for 30 bar and 160 deg C.).

The following table 1 shows a comparison of conventional welding process with an embodiment according to the present disclosure.

TABLE 1

| Parameter | Conventional welding process (Friction welding) | Present Case (Electron beam welding with full penetration) |
|---|---|---|
| Joint efficiency | 80% | 100% |
| Metallurgical compatibility with SS | No | Yes (through the transition of Inconel |
| Post-welding Machining requirement | Yes | Nil |
| Volumetric inspectability by non-destructive examination | No (Only surface examination is possible) | Yes. Through thickness weld can be examined |
| Rotation of the work piece | Yes | No |
| Effect on the base plate dimensional accuracies | Yes because of the high vibration and rotational effects | No. The base plate and connectors rigidly rest on the jig and dimensional accuracies are intact. |
| Possibilities of repair | No | Yes. Cut and re-weld is feasible. |
| Process reliability and repeatability | Low | High because of fully automated control of parameters |

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A method of manufacturing actively cooled accelerator grid with full penetration weld configuration comprising the steps of:
   a) machining a plurality of stubs;
   b) machining a first end and a second end of each of a plurality of inconel pipes;
   c) welding each of the plurality of the stubs with the first end of the each of the plurality of inconel pipes, thereby forming a water connector assembly;
   d) machining a base plate to prepare a plurality of weld edges in 'U' shape in accordance to a plurality of reference holes located on the base plate;
   e) full penetration welding of the base plate with the water connector assembly by electron beam welding;
   f) machining the base plate welded with the water connector assembly to create a hydraulic passage up to a manifold, wherein machining further comprises milling of a plurality of cooling channels across angled plane of the base plate welded with the water connector assembly;
   g) welding each of a plurality of external hydraulic circuits with the second end of the each of the plurality of inconel pipes.

2. The method as claimed in claim 1, wherein each of the plurality of stubs are made of copper.

3. The method as claimed in claim 1, wherein the base plate is made of copper.

4. The method as claimed in claim 1, wherein the welding is electron beam welding.

5. The method as claimed in claim 1, wherein welding each of the plurality of the external hydraulic circuits with the second end of each of the plurality of inconel pipes is performed using orbital TIG welding.

6. The method as claimed in claim 1, wherein the plurality of external hydraulic circuit comprises plurality of stainless steel tubes with at least one hollow end, wherein the hollow end is welded with the second end of of the plurality of inconel pipes.

* * * * *

UNITED STATES PATENT AND TRADEMARK OFFICE
CERTIFICATE OF CORRECTION

PATENT NO. : 10,480,863 B2
APPLICATION NO. : 15/709706
DATED : November 19, 2019
INVENTOR(S) : Jaydeep Joshi et al.

Page 1 of 1

It is certified that error appears in the above-identified patent and that said Letters Patent is hereby corrected as shown below:

In the Claims

Column 7, Line 14, Claim 6, after "of" first occurrence insert -- each --

Signed and Sealed this
Twenty-ninth Day of December, 2020

Andrei Iancu
*Director of the United States Patent and Trademark Office*